United States Patent
Aoki

(12) 
(10) Patent No.: US 6,437,798 B1
(45) Date of Patent: Aug. 20, 2002

(54) INFORMATION PROCESSING APPARATUS, INFORMATION PROCESSING METHOD, AND TRANSMISSION MEDIUM

(75) Inventor: Sachiyo Aoki, Tokyo (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/331,700

(22) PCT Filed: Oct. 28, 1998

(86) PCT No.: PCT/JP98/04886

§ 371 (c)(1),
(2), (4) Date: Aug. 13, 1999

(87) PCT Pub. No.: WO99/22343

PCT Pub. Date: May 6, 1999

(30) Foreign Application Priority Data

Oct. 28, 1997 (JP) .............................................. 9-295577

(51) Int. Cl.⁷ ................................................. G09G 5/00
(52) U.S. Cl. ........................ 345/649; 345/419; 345/474
(58) Field of Search ................................ 345/646, 647, 345/648, 649, 473, 474, 419

(56) References Cited

U.S. PATENT DOCUMENTS 4,580,229 A * 4/1986 Koyama et al. ............ 364/513
4,994,989 A * 2/1991 Usami et al. ................ 345/419
6,320,988 B1 * 11/2001 Yamaguchi et al. ........ 382/276
6,363,169 B1 * 3/2002 Ritter et al. ................. 382/154

FOREIGN PATENT DOCUMENTS

JP    8-315171 A    11/1996

* cited by examiner

*Primary Examiner*—Jeffery Brier
*Assistant Examiner*—Faranak Fouladi
(74) *Attorney, Agent, or Firm*—Lerner, David, Littenberg, Krumholz & Mentlik, LLP

(57) ABSTRACT

An information processing apparatus and an information processing method adapted for representing objects of various shapes as two-dimensional graphic or three-dimensional graphic to change corresponding object so as to take various states within three-dimensional virtual space. Among prepared plural three-dimensional attitudes of object, attitude A0 is selected as reference attitude. Vectors serving as rotation axes when rotation is made from the reference attitude to attitudes A1, A2 are multiplied by their rotational angles as length, and are multiplied by weighting coefficients corresponding to an input signal inputted by allowing user to operate an input unit. Further, those vectors are synthesized to thereby synthesize (generate) vector serving as new axis of rotation. By rotating the object in the state where that vector is caused to be axis of rotation and its length is caused to be rotation angle, target attitude An is obtained.

6 Claims, 7 Drawing Sheets

INFORMATION PROCESSING APPARATUS, INFORMATION PROCESSING METHOD, AND TRANSMISSION MEDIUM

TECHNICAL FIELD

This invention relates to an information processing apparatus, an information processing method and a transmission medium, and more particularly to an information processing apparatus, an information processing method and a transmission medium which are adapted to interpolate at least three attitudes or more of object to thereby improve degree of freedom of rotational operation of the object.

BACKGROUND ART

In information processing apparatuses such as computer game machine, etc., objects of various shapes (polygons) can be represented as two-dimensional graphic or three-dimensional graphic to change, within three-dimensional virtual space, corresponding objects so as to take various states, i.e., to allow them to carry out animation.

In order to change a predetermined object from a predetermined attitude to another attitude within the three-dimensional virtual space, it is sufficient to rotate it by a predetermined angle with a predetermined axis being as center. As a method of carrying out processing to rotate such object with an arbitrary axis being as center, there has been proposed a method disclosed in, e.g., the Japanese Laid Open Application No. 315171/1996 publication. In accordance with the method disclosed in this publication, such an approach is employed as shown in FIG. 7 to determine reference attitude (angle) A of an object 201, rotated attitude (target attitude) B thereof and a predetermined axis of rotation 202 to determine, on the assumption that the object 201 rotates within the range of 0 to $\theta$ around (about) the rotation axis with the rotation axis being as center, rotation angle $\theta d$ of object interpolated within such a range to determine interpolation rotation matrix Rd by using the rotation angle $\theta d$. A further approach is employed to dissolve the determined interpolation rotation matrix Rd into angle data around respective axes of X-axis, Y-axis and Z-axis of the three-dimensional coordinate system thus to calculate interpolation data.

Explanation will now be given in connection with a method of determining rotation matrix when a predetermined object rotates from a reference attitude with an arbitrary axis being as center. Rotation around (about) the origin of the three-dimensional coordinate system is represented by rotation matrix of 3×3. When it is now assumed that the coordinate system B is the coordinate system in which the coordinate system A is rotated by rx degrees around the X-axis, is rotated by ry degrees around the Y-axis and is rotated by rz degrees around the Z-axis in order, the rotation matrix R is represented by the following formula (1).

$$R = \begin{pmatrix} \cos(rz) & -\sin(rz) & 0 \\ \sin(rz) & \cos(rz) & 0 \\ 0 & 0 & 1 \end{pmatrix} \quad (1)$$

$$\begin{pmatrix} \cos(ry) & 0 & \sin(ry) \\ 0 & 1 & 0 \\ -\sin(ry) & 0 & \cos(ry) \end{pmatrix} \begin{pmatrix} 1 & 0 & 0 \\ 0 & \cos(rx) & -\sin(rx) \\ 0 & \sin(rx) & \cos(rx) \end{pmatrix}$$

It is further assumed that this formula (1) is represented by the formula (2) expressed below.

$$R = \begin{pmatrix} R_{11} & R_{12} & R_{13} \\ R_{21} & R_{22} & R_{23} \\ R_{31} & R_{32} & R_{33} \end{pmatrix} \quad (2)$$

In this case, transposed matrix $R^T$ of this rotation matrix R is represented by the formula (3) expressed below.

$$R^T = \begin{pmatrix} R_{11} & R_{21} & R_{31} \\ R_{12} & R_{22} & R_{32} \\ R_{13} & R_{23} & R_{33} \end{pmatrix} \quad (3)$$

$$= \begin{pmatrix} 1 & 0 & 0 \\ 0 & \cos(rx) & \sin(rx) \\ 0 & -\sin(rx) & \cos(rx) \end{pmatrix} \begin{pmatrix} \cos(ry) & 0 & -\sin(ry) \\ 0 & 1 & 0 \\ \sin(ry) & 0 & \cos(ry) \end{pmatrix}$$

$$\begin{pmatrix} \cos(rz) & \sin(rz) & 0 \\ -\sin(rz) & \cos(rz) & 0 \\ 0 & 0 & 1 \end{pmatrix}$$

In this case, since the formula expressed below holds, $$R^T R = 1 \quad (4)$$

this rotation matrix R is orthogonal matrix. Conversely, orthogonal matrix where |R|=1 is represented by the formula (4). This matrix is rotation matrix. Generally, it is known that the orthogonal matrix can be normalized as indicated below by using other orthogonal matrix T.

$$T^{-1}RT = \begin{pmatrix} 1 & 0 & 0 \\ 0 & \cos\theta & \sin\theta \\ 0 & -\sin\theta & \cos\theta \end{pmatrix} \quad (5)$$

When arbitrary two rotation matrices A, B exist, R is put (represented) as the following formula (6).

$$R = A^{-1}B \quad (6)$$

When this formula (6) is used, the above mentioned formula (5) can be expressed as below.

$$T^{-1}A^{-1}BT = \begin{pmatrix} 1 & 0 & 0 \\ 0 & \cos\theta & \sin\theta \\ 0 & -\sin\theta & \cos\theta \end{pmatrix} \quad (7)$$

When rotation matrix B is determined from this formula (7), it is represented by the formula (8) expressed below.

$$B = AT \begin{pmatrix} 1 & 0 & 0 \\ 0 & \cos\theta & \sin\theta \\ 0 & -\sin\theta & \cos\theta \end{pmatrix} T^{-1} \quad (8)$$

In this case, when angle is changed within the range from 0 to $\theta$, the previously described coordinate system (attitude) represented by A rotates around (about) a predetermined axis, resulting in coordinate system (attitude) of B. When orthogonal matrix of T is found out in this way, interpolation can be made between arbitrary two coordinate systems by rotation around (about) certain one rotation axis.

A method of finding out this orthogonal matrix T will now be described. Let find out vector which is eigen (intrinsic) vector of rotation matrix R, which satisfies the following relational expression, and has absolute value of 1.

$$Rt = t \quad (9)$$

When E is now assumed to be unit matrix, the following relational expression holds.

$$(R-E)t = 0 \quad (10)$$

Accordingly, t is orthogonal to component vector of matrix (R–E).

Further, linearly independent two (sets of) vectors of the matrix (R–E) are found out to provide outer product thereof. This vector is normalized. The normalized vector thus obtained is assumed to be $t_1$. Then, vector orthogonal to $t_1$ is found out. As this vector, either one of vectors of matrix (R–E) which generates $t_1$ may be used. This vector is also normalized. The normalized vector thus obtained is assumed to be $t_2$. Then, outer product of $t_1$ and $t_2$ is provided. The vector thus obtained is assumed to be $t_3$. Since these $t_1$ to $t_3$ all have absolute values of 1 and are orthogonal to each other, matrix ($t_1$ $t_2$ $t_3$) is orthogonal matrix.

Assuming now that the matrix ($t_1$ $t_2$ $t_3$) is orthogonal matrix T, the left side of the formula (5) can be represented as the formula (11) indicated below.

$$T^{-1}RT = (t_1 \quad t_2 \quad t_3)^{-1} R (t_1 \quad t_2 \quad t_3) \quad (11)$$

$$= \begin{pmatrix} t_1^T \\ t_2^T \\ t_3^T \end{pmatrix} R (t_1 \quad t_2 \quad t_3)$$

$$= \begin{pmatrix} t_1^T R t_1 & t_1^T R t_2 & t_1^T R t_3 \\ t_2^T R t_1 & t_2^T R t_2 & t_2^T R t_3 \\ t_3^T R t_1 & t_3^T R t_2 & t_3^T R t_3 \end{pmatrix}$$

In this case, $t_1$ to $t_3$ can be represented by the formula (12) expressed below by using the formula (9).

$$t_1^T R t_1 = t_1^T t_1$$
$$t_2^T R t_1 = t_2^T t_1$$
$$t_3^T R t_1 = t_3^T t_1 \quad (12)$$

By using these relational expressions, the formula (11) can be represented by the formula (13) expressed below.

$$T^{-1}RT = \begin{pmatrix} 1 & 0 & 0 \\ 0 & t_2^T R t_2 & t_2^T R t_3 \\ 0 & t_3^T R t_2 & t_3^T R t_3 \end{pmatrix} \quad (13)$$

Then, respective elements (components) of the formula (13) are put as indicated by the formula (14) expressed below.

$$T^{-1}RT = \begin{pmatrix} 1 & 0 & 0 \\ 0 & A & B \\ 0 & C & D \end{pmatrix} \quad (14)$$

In this case, since T and R are both orthogonal matrices, $T^{-1}RT$ is also orthogonal matrix. The following relational expressions hold.

$$A^2 + C^2 = 1 \quad (15)$$

$$B^2 + D^2 = 1 \quad (16)$$

$$A^2 + B^2 = 1 \quad (17)$$

$$C^2 + D^2 = 1 \quad (18)$$

$$AB + CD = 0 \quad (19)$$

$$AC + BD = 0 \quad (20)$$

$$AD - BC = 1 \quad (21)$$

Subtraction of the formula (18) from the formula (15) gives $$A^2 - D^2 = 0, A = \pm D$$

Further, when $A = -D$, substitution thereof into the formula (19) gives $$D(C - B) = 0$$

Thus, D=0 or B=C. Substitution of D=0 into the formula (21) gives $$-BC = 1$$

Further, subtraction of the formula (17) from the formula (15) gives $$B = \pm C$$

Thus, the following relational expression is obtained.

$$B = -C = \pm 1$$

On the other hand, substitution of A=−D, B=C into the formula (21) gives $$-D^2 - C^2 = 1$$

This is contradictory. Therefore, the following relational expression is obtained.

$$A = D = 0, B = -C = \pm 1$$

Now, when A=D, substitution of this relational expression into the formula (19) gives $$D(B + C) = 0$$

Thus, D=0 or B=−C is obtained.

When D=0, the relational expression B=−C=±1 is similarly obtained.

Further, when D≠0, B=−C. Therefore, in either case, the following relational expressions are obtained.

$$A = D$$

$$B = -C$$

$$C^2 + D^2 = 1$$

Thus, the above-mentioned formula (5) holds.

In this way, the orthogonal matrix T which satisfies the formula (5) can be found out. Further, rotation matrix Rd when rotation is made by rotation angle θd from the reference attitude with an arbitrary axis being as center can be determined from the formula (5) in a manner indicated below.

$$Rd = T \begin{pmatrix} 1 & 0 & 0 \\ 0 & \cos\theta d & \sin\theta d \\ 0 & -\sin\theta d & \cos\theta d \end{pmatrix} T^{-1}$$

By using such a method, interpolation processing with respect to rotation of object is carried out.

However, in the conventional interpolation processing with respect to rotation of object, since interpolation is carried out only between two points (two attitudes), limitation takes place in the degree of freedom of motion (movement) of object. As a result, it is difficult to realize natural (smooth) change of attitude.

In addition, operation (computation) of the rotation matrix becomes complicated as described above.

DISCLOSURE OF THE INVENTION

This invention has been proposed in view of such circumstances and its object is to provide a novel information processing apparatus, a novel information processing method and a novel transmission medium which are capable of improving degree of freedom of rotation operation of object.

An information processing apparatus according to this invention comprises: selector means for selecting, as reference attitude, any one of prepared plural attitudes of an object; first generating means for generating vectors serving as respective rotation axes for changing the reference attitude selected by the selector means into at least two other attitudes or more; first calculating means for calculating rotation angles when the object is changed from the reference attitude to the other attitudes with the vectors generated by the first generating means being as rotation axes; converting means for converting lengths of the vectors into lengths corresponding to the rotation angles calculated by the first calculating means; second generating means for synthesizing the vectors of which lengths are converted by the converting means to generate interpolation vector; second calculating means for calculating length of the interpolation vector generated by the second generating means; and third generating means for rotating the reference attitude of the object by angle corresponding to the length calculated by the second calculating means with the interpolation vector being as rotation axis to generate target attitude.

Moreover, an information processing method according to this invention comprises: a selection step of selecting, as reference attitude, any one of prepared plural attitudes of an object; a first generation step of generating vectors serving as respective rotation axes for changing the reference attitude selected by the selection step into at least two other attitudes or more; a first calculation step of calculating rotation angles when the object is changed from the reference attitude to the other attitudes with the vectors generated at the first generation step being as rotation axes; a conversion step of converting lengths of the vectors into lengths corresponding to the rotation angles calculated at the first calculation step; a second generation step of synthesizing the vectors of which lengths are converted at the conversion step to generate interpolation vector; a second calculation step of calculating length of the interpolation vector generated at the second generation step; and a third generation step of rotating the reference attitude of the object by angle corresponding to the length calculated at the second calculation step with the interpolation vector being as rotation axis to generate target attitude.

Further, a transmission medium according to this invention is adapted so that computer program is caused to undergo transmission, the computer program including: a selection step of selecting, as reference attitude, any one of prepared plural attitudes of an object; a first generation step of generating vectors serving as respective rotational axes for changing the reference attitude selected by the selection step into at least two other attitudes or more; a first calculation step of calculating rotation angles when the object is changed from the reference attitude to the other attitudes with the vectors generated at the first generation step being as rotation axes; a conversion step of converting lengths of the vectors into lengths corresponding to the rotation angles calculated at the first calculation step; a second generation step of synthesizing the vectors of which lengths are converted at the conversion step to generate interpolation vector; a second calculation step of calculating length of the interpolation vector generated at the second generation step; and a third generation step of rotating the reference attitude of the object by angle corresponding to the length calculated at the second calculation step with the interpolation vector being as rotation axis to generate target attitude.

In the information processing apparatus, the information processing method and the transmission medium according to this invention, any one of prepared plural attitudes of object is selected as reference attitude. Vectors serving as respective rotation axes for changing the selected reference attitude into at least two other attitudes or more are generated. Rotation angles when the object is changed from the reference attitude to the other attitudes with the generated vectors being as rotation axes. Lengths of the vectors are converted into lengths corresponding to the rotational angles. The vectors of which lengths are converted are synthesized so that interpolation vector is generated. Length of the generated interpolation vector is calculated. The reference attitude of the object is rotated by angle corresponding to the calculated length with the interpolation vector being as rotation axis. Thus, target attitude is generated.

BEST MODE FOR CARRYING OUT THE INVENTION

An information processing apparatus, an information processing method and a transmission medium according to this invention will be described below.

The information processing apparatus according to this invention comprises: selector means (e.g., step S101 of FIG. 3) for selecting, as reference attitude, any one of prepared plural attitudes of an object; first generating means (e.g., step S102 of FIG. 3) for generating vectors serving as respective rotation axes for changing the reference attitude selected by the selector means into at least two other attitudes or more; first calculating means (e.g., step S103 of FIG. 3) for calculating rotation angles when the object is changed from the reference attitude to the other attitudes with the vectors generated by the first generating means being as rotation axes; converting means (e.g., step S104 of FIG. 3) for converting lengths of the vectors into lengths corresponding to the rotation angles calculated by the first calculating means, second generating means (e.g., step S105 of FIG. 3) for synthesizing the vectors of which lengths are converted by the converting means to generate interpolation vector; second calculating means (e.g., step S106 of FIG. 3) for calculating length of the interpolation vector generated by the second generating means; and third generating means (e.g., step S107 of FIG. 3) for rotating the reference attitude of the object by angle corresponding to the length calculated by the second calculating means with the interpolation vector being as rotation axis to generate target attitude.

Moreover, the information processing apparatus according to this invention further comprises input means (e.g., input unit 17 of FIG. 1) for inputting an input signal, and multiplier means (e.g., CPU 11 of FIG. 1) for multiplying vectors generated by the first generating means by weighting coefficients corresponding to input signal inputted by the input means.

Further, the information processing apparatus according to this invention further comprises third calculating means (e.g., CPU 11 of FIG. 1) for calculating rotation matrix for rotating, by a predetermined angle θ, vector (x, y, z) serving as a predetermined rotation axis by the following formula, $$\begin{pmatrix} (1-\cos\theta)x^2+\cos\theta & (1-\cos\theta)xy+z\sin\theta & (1-\cos\theta)xz-y\sin\theta \\ (1-\cos\theta)xy-z\sin\theta & (1-\cos\theta)y^2+\cos\theta & (1-\cos\theta)yz+x\sin\theta \\ (1-\cos\theta)xz+y\sin\theta & (1-\cos\theta)yz+x\sin\theta & (1-\cos\theta)z^2+\cos\theta \end{pmatrix}$$

wherein the third generating means uses the rotation matrix calculated by the third calculating means when interpolation attitude is generated.

Furthermore, the information processing apparatus according to this invention further comprises fourth generating means (e.g., step S101 of FIG. 3) for generating arbitrary attitude as reference attitude.

Figure 1:
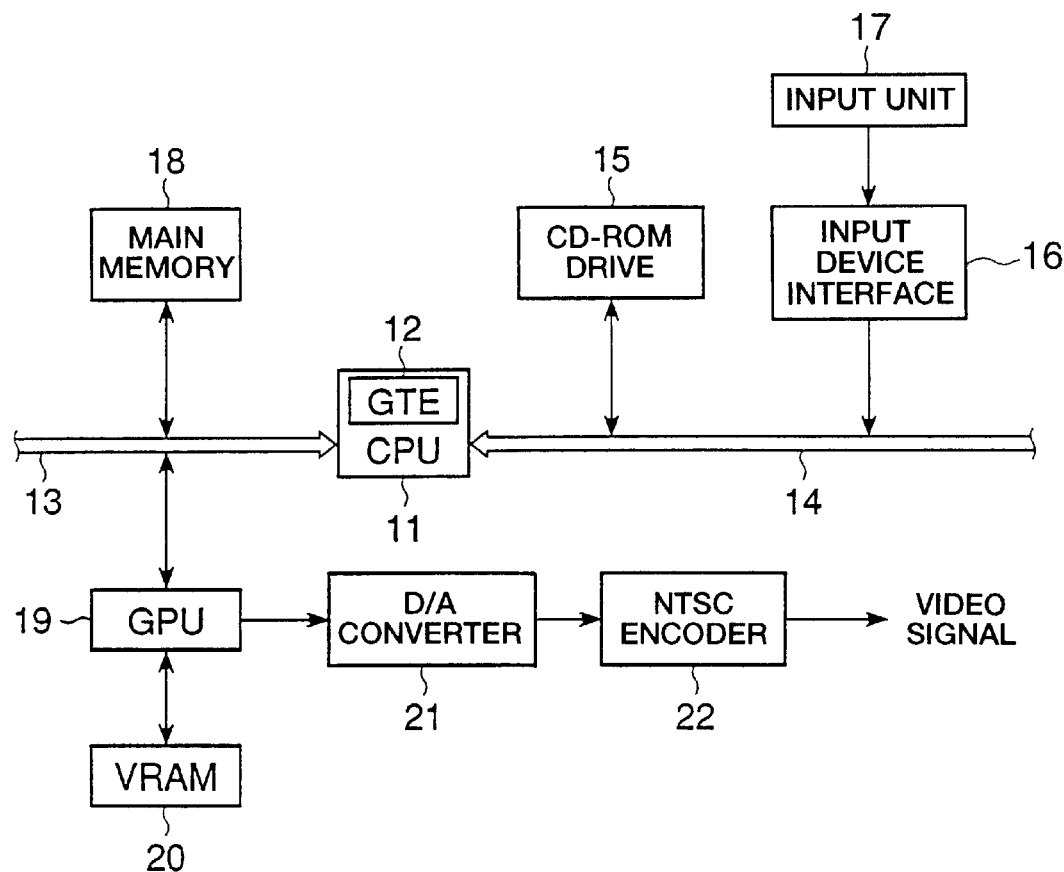
FIG. 1 is a block diagram showing an example of the configuration of an information processing apparatus according to this invention.

The information processing apparatus according to this invention has configuration as indicated by the block diagram shown in FIG. 1. In this example, the CPU 11 controls respective units (components) and carries out multiple interpolation processing of attitude of object. Moreover, the CPU 11 includes a GTE (Geometry Transfer Engine) 12. This GTE 12 carries out, in accordance with request from the CPU 11, geometry processing such as coordinate transform (conversion), light source calculation, matrix operation (computation) or vector operation (computation), etc. with respect to model data of object. Further, a main bus 13 through which data transfer is carried out at relatively high speed and a sub bus 14 through which data transfer is carried out at relatively low speed are connected to the CPU 11. Thus, transmission/reception of data can be carried out through these buses.

A CD-ROM drive 15 and an input device interface 16 are connected to the sub bus 14. The CD-ROM drive 15 reads out, by instruction of the CPU 11, various data or programs from CD-ROM as recording medium attached thereto. The input device interface 16 accepts (receives) input signal from the input unit 17, e.g., control pad to output it to the CPU 11 through the sub bus 14.

A main memory 18 and a GPU (Graphic Processing Unit) 19 are connected to the main bus 13. The main memory 18 stores data which has been read out from the CD-ROM drive 15, data as operation (computed) result of the CPU 11, and the like. The GPU 19 reads out model data of object to be displayed from the main memory 18 to carry out rendering processing to store the processed model data of object into a VRAM (Video Random Access Memory) 20. The GPU 19 further reads out data stored in the VRAM 20 to output it to a D/A converter 21. The VRAM 20 includes frame memory and Z buffer which are not shown, and serves to allow the frame buffer to store data of picture (object) displayed on screen and to allow the Z buffer to store data of object located at the foreground of objects displayed on the screen.

The D/A converter 21 converts data outputted from the GPU 19 from digital signal to analog signal to output it to a NTSC (National Television System Committee) encoder 22. The NTSC encoder 22 synthesizes color signal and luminance signal from the D/A converter 21 to output it to monitor (not shown) as video signal (composite signal) of the NTSC system.

Figure 2:
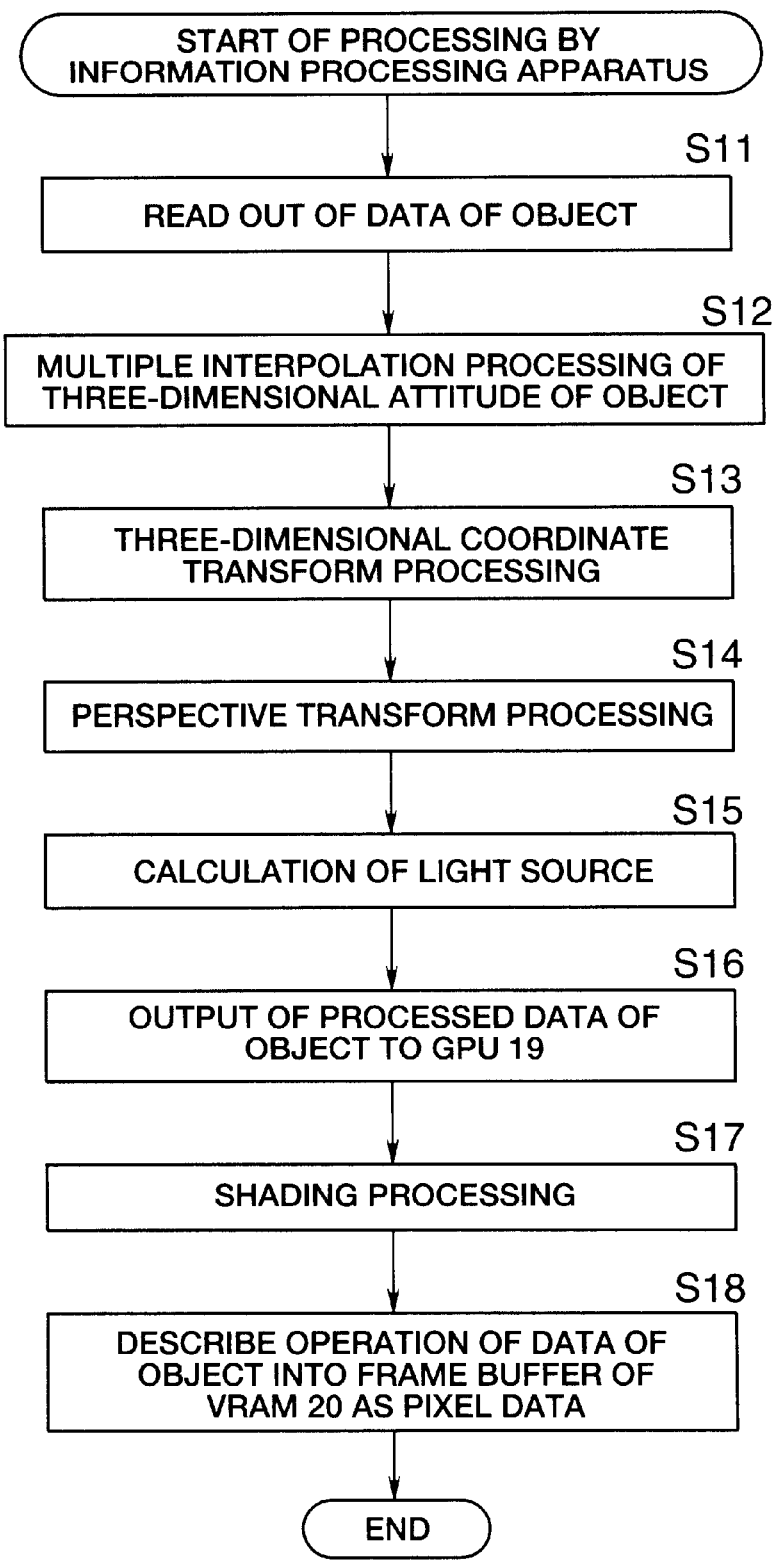
FIG. 2 is a flow chart for explaining the operation of the information processing apparatus shown in FIG. 1.

The operation of the information processing apparatus will now be described with reference to the flow chart shown in FIG. 2. Initially, at step S11, the CPU 11 reads out, from (the CD-ROM of) the CD-ROM drive 15, data of object to be processed to read it into the main memory 18. At step S12, the CPU 11 carries out multiple interpolation processing of object (of which detail will be described later) by using weighting coefficients inputted by allowing user to operate the input unit 17.

The GTE 12 transforms (converts) data of object which has been multiple-interpolated by the CPU 11 into three-dimensional coordinate data within three-dimensional virtual space at step S13, and carries out perspective transform (conversion) of the three-dimensional coordinate data transformed (converted) at the step S13 into two-dimensional coordinate data at step S14. Namely, three-dimensional coordinates of object placed (located) within the virtual space are transformed (converted) into coordinates in the state viewed from two-dimension (the state viewed on the monitor). Subsequently, at step S15, the GTE 12 calculates luminance of data of object from position and direction of the light source placed (located) within the virtual space. Subsequently, at step S16, the GTE 12 outputs processed data of object to the GPU 19.

The GPU 19 carries out shading with respect to data of object from the GTE 12 at step S17, and describes (depicts) the data of object thus obtained into the frame buffer of the VRAM 20 as pixel data at step S18.

Figure 3:
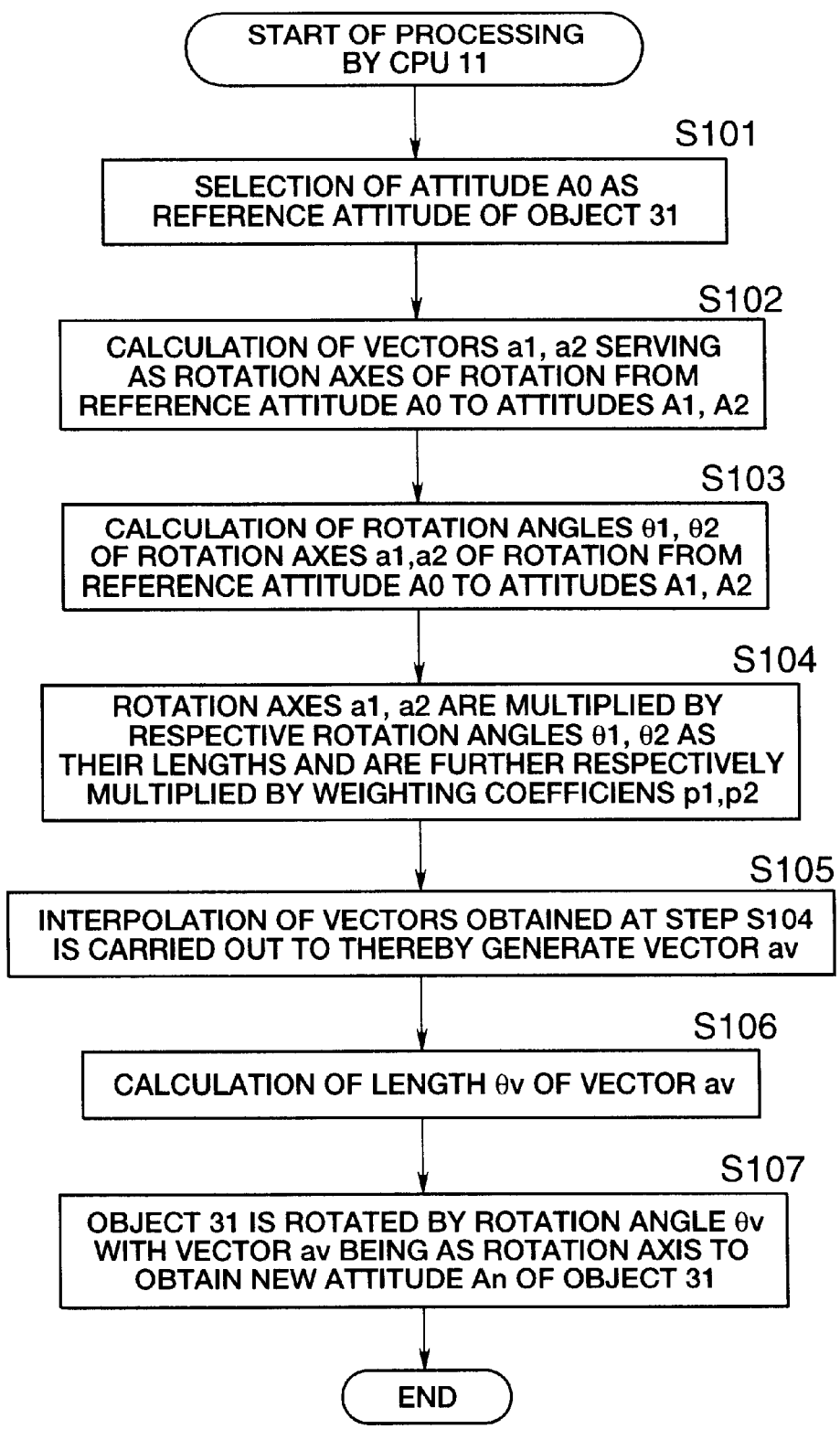
FIG. 3 is a flow chart for explaining an example of multiple interpolation processing of three-dimensional attitude of object.
Figure 4:
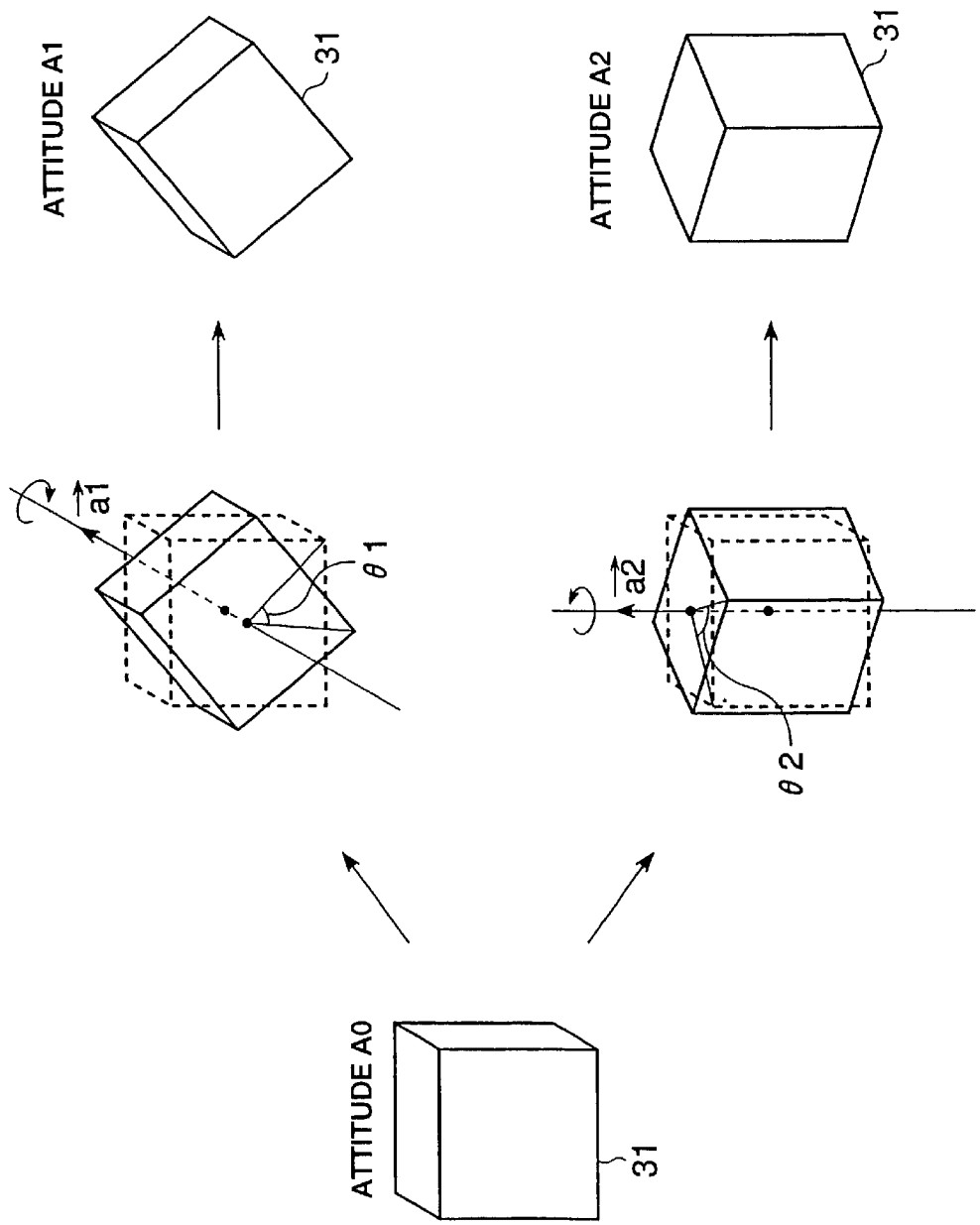
FIG. 4 is a view for explaining rotation from reference attitude to other attitudes of object.

Multiple interpolation processing of three-dimensional attitude of object at the step S12 will now be described in detail with reference to the flow chart of FIG. 3. In the embodiment of this invention, at least three attitudes (angles) are assumed to be prepared with respect to one object. In this example, three attitudes A0 to A2 of an object 31 as shown in FIG. 4 are assumed to be prepared in the main memory 18. Initially, at step S101, the CPU 11 selects one attitude (e.g., attitude A0) as reference attitude from these three attitudes. It is to be noted that while reference attitude is selected from prepared attitudes in this case, an approach may be employed to generate new attitude to select it as reference attitude.

At step S102, the CPU 11 calculates vectors a1 and a2 serving as axes of rotation when the object is changed from the attitude A0 to the respective attitudes A1 and A2 as shown to allow their lengths (absolute values) to be 1. Since the method of calculating these vectors corresponds to that indicated in the prior art, its detailed explanation is omitted.

Subsequently, the CPU 11 determines rotation angles θ1 and θ2 of respective rotation axes (vectors) a1 and a2 when the object is changed from the reference attitude A0 to the attitude A1 and the attitude A2 at step S103. Since such calculating method corresponds to the calculating method for θ represented by the previously described formula (5), its detailed explanation is omitted.

Further, at step S104, the CPU 11 multiples respective rotation axes a1, a2 by rotation angles θ1, θ2 as their lengths to further respectively multiply them by weighting coefficients p1, p2 corresponding to input signal from the input unit 17 by user. Thus, the relational expressions with respect to the rotation axes a1, a2 are respectively given by the formulas (22) and (23) expressed below.

$$p1 \times \theta1 \times \vec{ia1} \quad (22)$$

$$p2 \times \theta2 \times \vec{ia2} \quad (23)$$

Figure 5:
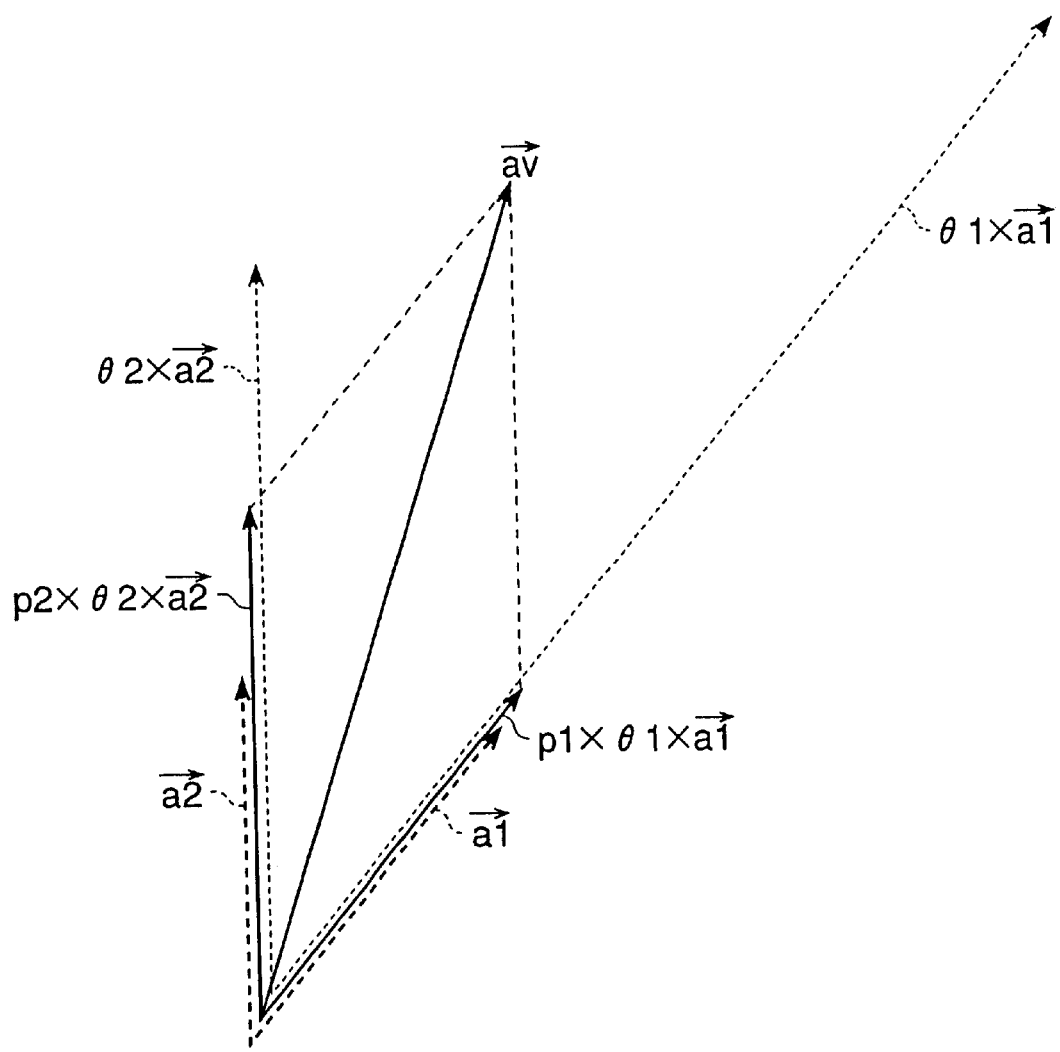
FIG. 5 is a view for explaining processing to generate (interpolation) vector serving as axis of rotation when rotation is made so that there results target attitude.

Further, at step S105, the CPU 11 interpolates (synthesizes) these vectors as shown in FIG. 5 to thereby generate vector av expressed by the following formula (24).

$$+\vec{iav} = (p1 \times \theta1 \times \vec{ia1}) + (p2 \times \theta2 \times \vec{ia2}) \quad (24)$$

Figure 6:
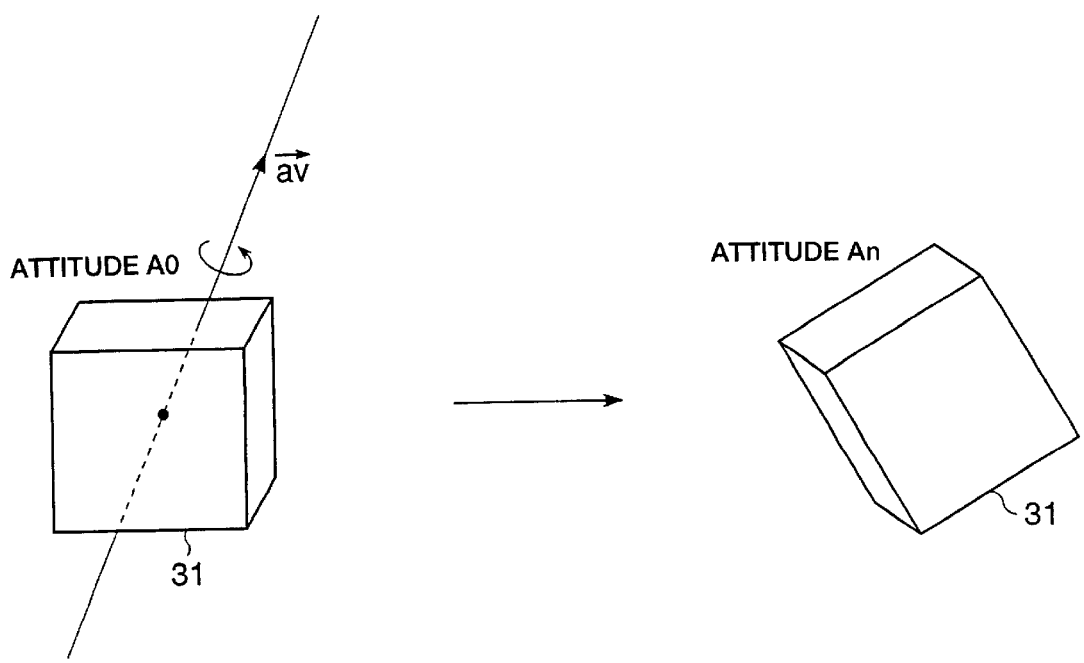
FIG. 6 is a view for explaining rotation from reference attitude to target attitude of object.
Figure 7:
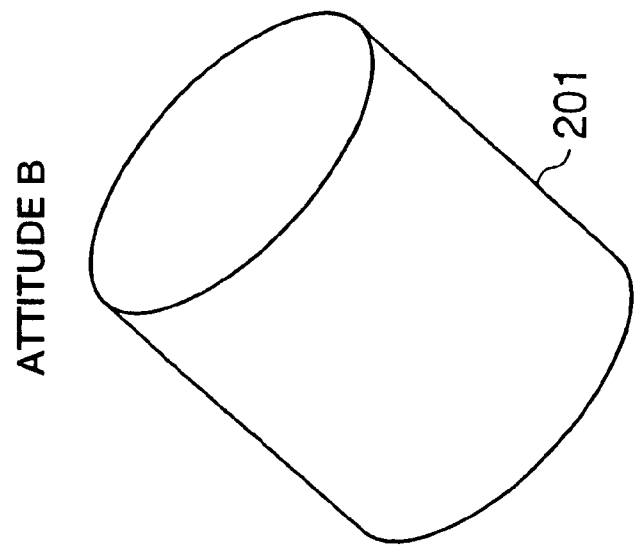
FIG. 7 is a view for explaining an example of conventional interpolation processing of attitude of object.
Figure 7:
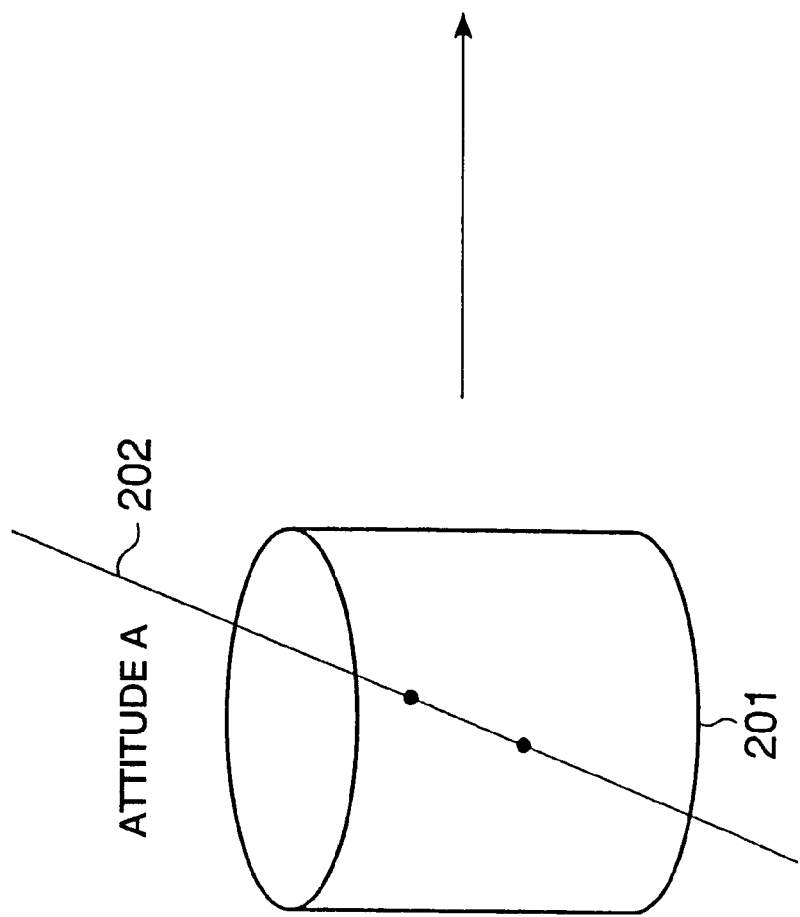

At step S106, length θv of this vector av is calculated. The processing operation then proceeds to step S107, at which the CPU 11 rotates reference attitude A0 of the object 31 in the state where vector av is caused to be axis of rotation and length θv of the vector av is caused to be rotation angle as shown in FIG. 6 to thereby obtain (determine) new attitude An of the object 31.

Here, rotation axis av of the object 31 is put as av=(x, y, z) for simplicity and the object is assumed to be rotated by rotation angle θ around (about) this rotation axis. Determination of rotation matrix M at this time will be described below. Matrix E expressed by the following formula (25) satisfies the condition that respective columns and respective rows are unit vector, and the respective columns are orthogonal to each other and the respective rows are also orthogonal to each other.

$$E = \begin{pmatrix} x & y & z \\ e & f & g \\ h & j & k \end{pmatrix} \quad (25)$$

The transposed matrix F of the formula (25) is represented by the formula (26) expressed below.

$$F = \begin{pmatrix} x & e & h \\ y & f & j \\ z & g & k \end{pmatrix} \quad (26)$$

Moreover, rotation matrix R for rotating a predetermined coordinate system by rotation angle θ around (about) the X-axis is represented by the formula (27) expressed below.

$$R = \begin{pmatrix} 1 & 0 & 0 \\ 0 & \cos\theta & \sin\theta \\ 0 & -\sin\theta & \cos\theta \end{pmatrix} \quad (27)$$

When sin θ=s, cos θ=c are put here for convenience of explanation, rotation matrix M is determined as indicated by the formula (28) expressed below by using the above-mentioned formulas (15) to (17).

$$M = F \times R \times E \quad (28)$$

$$= \begin{pmatrix} e^2c + h^2c + x^2 & xy + efc + ejs - fhs + hjc & xz + egc + eks - ghs + hkc \\ xy + efc - ejs + fhs + hjc & f^2c + j^2c + y^2 & yz + fgc + fks - gjs - jkc \\ xz + egc - eks + ghs + hkc & yz + fgc - fks + gjs + jkc & g^2c + k^2c + z^2 \end{pmatrix}$$

When ej−fh=zA is put here to simplify the formula (28), the rotation matrix M is as indicated by the formula (29) expressed below.

$$M = \begin{pmatrix} (1-c)x^2 + c & (1-c)xy + (zA)s & (1-c)xz + (-yA)s \\ (1-c)xy + (-zA)s & (1-c)y^2 + c & (1-c)yz + (xA)s \\ (1-c)xz + (yA)s & (1-c)yz + (-xA)s & (1-c)z^2 + c \end{pmatrix} \quad (29)$$

In this formula, when the orthogonal condition and the normalization condition of the matrices E, F are further used, A is equal to 1 (A=1). Thus, the rotation matrix M can be represented by the formula (30) expressed below.

$$M = \begin{pmatrix} (1-c)x^2 + c & (1-c)xy + zs & (1-c)xz + ys \\ (1-c)xy - zs & (1-c)y^2 + c & (1-c)yz + xs \\ (1-c)xz + ys & (1-c)yz - xs & (1-c)z^2 + c \end{pmatrix} \quad (30)$$

$$= \begin{pmatrix} (1-\cos\theta)x^2 + \cos\theta & (1-\cos\theta)xy + z\sin\theta & (1-\cos\theta)xz - y\sin\theta \\ (1-\cos\theta)xy - z\sin\theta & (1-\cos\theta)y^2 + \cos\theta & (1-\cos\theta)yz + x\sin\theta \\ (1-\cos\theta)xz + y\sin\theta & (1-\cos\theta)yz - x\sin\theta & (1-\cos\theta)z^2 + \cos\theta \end{pmatrix}$$

Further, this rotation matrix M is dissolved into angular data with respect to respective axes of X, Y, Z. Thus, data of attitude An of the object 31 can be obtained.

In a manner as stated above, at least three attitudes or more are interpolated with respect to one object to thereby determine target three-dimensional attitude. Thus, degree of rotation operation (animation) of object is improved.

While three attitudes are interpolated in the above-described embodiment, larger number of attitudes may be prepared to interpolate those attitudes, thereby making it possible to more smoothly represent rotation operation of object.

In addition, as transmission medium where program for carrying out processing as described above is caused to undergo transmission, communication medium such as network, satellite, etc. can be utilized in addition to recording (storage) medium such as magnetic disc. CD-ROM or solid-state memory, etc.

INDUSTRIAL APPLICABILITY

In accordance with the information processing apparatus, the information processing method and the transmission medium, such an approach is employed to select, as reference attitude, any one of prepared plural attitudes of object to generate vectors serving as respective axes of rotation for changing the selected reference attitude into at least two other attitudes or more to calculate rotation angles when the object is changed from the reference attitude to the other attitudes with the generated vectors being as axes of rotation to convert lengths of the vectors so as to have lengths corresponding to the rotation angles to synthesize the vectors of which lengths have been converted to generate interpolation vector to calculate length of the interpolation vector thus generated to rotate the reference attitude of the object by angle corresponding to the calculated length with the interpolation vector being as rotation axis to thereby generate target attitude. Accordingly, degree of freedom of the rotation operation of object is improved, thus making it possible to realize more natural (smooth) change.

What is claimed is:

1. An information processing apparatus adapted for carrying out processing to change attitude of a predetermined object within three-dimensional virtual space, the apparatus comprising:

selector means for selecting, as reference attitude, any one of prepared plural attitudes of the object;

first generating means for generating vectors serving as respective rotation axes when the reference attitude selected by the selector means is changed into at least two other attitudes or more;

first calculating means for calculating rotation angles when the object is changed from the reference attitude to corresponding ones of the other attitudes with the vectors generated by the first generating means being as rotation axes;

converting means for converting lengths of the vectors into lengths corresponding to the rotation angles calculated by the first calculating means;

second generating means for synthesizing the vectors of which lengths are converted into lengths corresponding to the rotation angles by the converting means to generate interpolation vector;

second calculating means for calculating length of the interpolation vector generated by the second generating means; and third generating means for rotating the reference attitude of the object by angle corresponding to the length calculated by the second calculating means with the interpolation vector being as axis of rotation to generate target interpolation attitude.

2. An information processing apparatus as set forth in claim 1, which further comprises input means for inputting an input signal and multiplying means for multiplying vectors generated by the first generating means by weighting coefficients corresponding to the input signal inputted by the input means.

3. An information processing apparatus as set forth in claim 1, which further comprises third calculating means for calculating rotation matrix for rotating vector (x, y, z) as a predetermined rotation axis by a predetermined angle θ by using the following formula $$\begin{pmatrix} (1-\cos\theta)x^2 + \cos\theta & (1-\cos\theta)xy + z\sin\theta & (1-\cos\theta)xz - y\sin\theta \\ (1-\cos\theta)xy - z\sin\theta & (1-\cos\theta)y^2 + \cos\theta & (1-\cos\theta)yz + x\sin\theta \\ (1-\cos\theta)xz + y\sin\theta & (1-\cos\theta)yz - x\sin\theta & (1-\cos\theta)z^2 + \cos\theta \end{pmatrix}$$

wherein the third generating means uses the rotation matrix calculated by the third calculating means when the interpolation attitude is generated.

4. An information processing apparatus as set forth in claim 1, which further comprises fourth generating means for generating an arbitrary attitude, wherein the first generating means generates vectors serving as respective axes of rotation when the reference attitude generated by the fourth generating means is changed into at least two other attitudes or more.

5. An information processing method for carrying out a processing to change attitude of a predetermined object within three-dimensional virtual space, the method comprising:

a selection step of selecting, as reference attitude, any one of prepared plural attitudes of the object;

a first generation step of generating vectors serving as respective rotation axes when the reference attitude selected by the selection step is changed into at least two other attitudes or more;

a first calculation step of calculating rotation angles when the object is changed from the reference attitude to corresponding ones of the other attitudes with the vectors generated at the first generation step being as rotation axes;

a conversion step of converting lengths of the vectors into lengths corresponding to the rotation angles calculated at the first calculation step;

a second generation step of synthesizing the vectors of which lengths are converted into lengths corresponding to the rotation angles to generate interpolation vector;

a second calculation step of calculating length of the interpolation vector generated at the second generation step; and a third generation step of rotating the reference attitude of the object by angle corresponding to the length calculated at the second calculation step with the interpolation vector being axis of rotation to generate target interpolation attitude.

6. A transmission medium adapted so that computer program is caused to undergo transmission, wherein the computer program is used in an information processing apparatus adapted for carrying out a processing to change attitude of a predetermined object within three-dimensional virtual space, the computer program including;

a selection step of selecting, as reference attitude, any one of prepared plural attitudes of the object;

a first generation step of generating vectors serving as respective rotation axes when the reference attitude selected at the selection step is changed into at least two other attitudes or more;

a first calculation step of calculating rotational angles when the object is changed from the reference attitude to corresponding ones of the other attitudes with the vectors generated at the first generation step being rotation axes;

a conversion step of converting lengths of the vectors into lengths corresponding to the rotation angles calculated at the first calculation step;

a second generation step of synthesizing the vectors of which lengths are converted into lengths corresponding to the rotation angles at the conversion step to generate interpolation vector;

a second calculation step of calculating length of the interpolation vector generated at the second generation step; and a third generation step of rotating the reference attitude of the object by angle corresponding to the length calculated at the second calculation step with the interpolation vector being as rotation axis to generate target interpolation attitude.

* * * * *

UNITED STATES PATENT AND TRADEMARK OFFICE
CERTIFICATE OF CORRECTION

PATENT NO.    : 6,437,798 B1
DATED         : August 20, 2002
INVENTOR(S)   : Sachiyo Aoki It is certified that error appears in the above-identified patent and that said Letters Patent is hereby corrected as shown below:

<u>Column 9,</u>

Line 14, "$+\vec{ia1}$" should read -- $\vec{a1}$ --.

Line 16, "$+\vec{ia2}$" should read -- $\vec{a2}$ --.

Line 21, delete "+i" in all three occurrences.

Signed and Sealed this

Twenty-eighth Day of January, 2003

JAMES E. ROGAN
*Director of the United States Patent and Trademark Office*